United States Patent [19]

Taylor et al.

[11] 4,206,634

[45] Jun. 10, 1980

[54] TEST APPARATUS AND METHOD FOR AN ENGINE MOUNTED FUEL PUMP

[75] Inventors: Dennis O. Taylor; David L. Reid; Clarence E. Kincaid; Donald R. Haefner, all of Columbus, Ind.

[73] Assignee: Cummins Engine Company, Inc., Columbus, Ind.

[21] Appl. No.: 940,080

[22] Filed: Sep. 6, 1978

[51] Int. Cl.$^2$ .............................................. G01M 15/00

[52] U.S. Cl. .................................................... 73/119 A

[58] Field of Search ................. 73/119 A, 118, 119 R, 73/168

[56] References Cited

U.S. PATENT DOCUMENTS

| | | | |
|---|---|---|---|
| 3,128,750 | 4/1964 | Schmidt | 123/140 |
| 3,139,875 | 7/1964 | Link | 123/140 |
| 3,340,728 | 9/1967 | Taylor et al. | 73/118 |
| 3,374,667 | 3/1968 | Mayer | 73/119 A |
| 3,577,776 | 5/1971 | Brown | 73/119 A |
| 3,745,818 | 7/1973 | Gaenzler | 73/119 A |
| 3,945,302 | 3/1976 | Downs | 92/13.2 |

*Primary Examiner*—Jerry W. Myracle
*Attorney, Agent, or Firm*—Sixbey, Friedman & Leedom

[57] ABSTRACT

A test apparatus and method is disclosed for a fuel pump mounted on and driven by an engine, the speed of which is controlled by the pressure of fuel supplied thereto wherein the engine continues to be supplied with fuel from the fuel pump during the test. A fluid circuit is provided which is designed to supply fuel to the engine under controlled pressure to permit the engine speed to be controlled independently of the engine throttle position and to permit the flow rate of the fuel to be adjusted to a predetermined value at which the output pressure of the fuel pump may be measured for calibration purposes. The fluid circuitry and necessary measurement circuitry may be mounted within a small, portable housing to allow for field testing of a fuel pump.

18 Claims, 5 Drawing Figures

TEST APPARATUS AND METHOD FOR AN ENGINE MOUNTED FUEL PUMP

BACKGROUND OF THE INVENTION

1. Field of Invention

This invention relates to the field of testing internal combustion engine fuel pumps and, in particular, the field of testing fuel pumps while the pump remains mounted on and driven by the engine to which fuel is supplied by the pump.

2. Discussion of the Prior Art

Engine fuel pumps are normally tested "off engine" whereby the fuel pump is removed from the engine and mounted on a special test stand. One example of such test apparatus is disclosed in U.S. Pat. No. 3,340,728 wherein the test stand includes a variable speed drive for controlling the pump speed during the test combined with gauges for measuring the flow characteristics of the pump. While suitable for some purposes, a far preferable approach has been the more recent development of various techniques by which a fuel pump may be tested "on engine", that is, while the pump remains mounted on and driven by the engine to which the pump normally supplies fuel. One example of the more desirable "on engine" fuel pump test devices is disclosed in U.S. Pat. No. 3,745,818 which discloses a portable apparatus for determining if adjustments are required in the calibration of a fuel pump by measuring fuel flow rates and pressures at selected engine speeds while the fuel pump remains mounted on the engine. Apparatus of the type disclosed in U.S. Pat. No. 3,745,818 can significantly reduce the time necessary for properly diagnosing and calibrating a fuel pump by eliminating the time required for transferring the pump from the engine to a test stand and back to the engine which procedure may easily require more time than does the actual fuel pump test.

While an "on engine" fuel pump test apparatus is well suited for many types of engines, even engines equipped with sophisticated fuel injection systems, special and unique problems arise when "on engine" fuel pump testing is performed on an internal combustion engine whose speed is controlled by the fuel pressure supplied by the pump to the engine. One example of such an engine is disclosed in U.S. Pat. No. 3,128,750. Manufacturer's specifications for calibrating fuel pumps often require the pump to produce a specified output pressure when operated under one of a plurality of check point conditions each of which is defined by a specific fuel pump speed and a corresponding output flow rate. In order to calibrate such a fuel pump while on the engine, some means other than the normal engine throttle must be provided to control selectively the engine speed thereby to cause the engine to drive the fuel pump at each of the check point speeds while the necessary flow rate and pressure measurements are made.

U.S. Pat. No. 3,577,776, assigned to the same assignee as the present application, discloses a fuel pump testing method and apparatus for an engine whose speed is responsive to fuel pressures wherein engine speed is controlled during an "one engine" fuel pump test by providing an auxiliary source of pressurized fuel. This source is completely separate from the engine's normal fuel supply system and includes an auxiliary fuel pump driven by its own motor and a manually operated control valve for selectively supplying a controlled fuel pressure to the engine whereby the engine speed may be independently controlled. Because an entirely separate fuel supply system is required, the apparatus disclosed in U.S. Pat. No. 3,577,776 tends to be expensive, heavy and complicated thus obviating many of the advantages normally associated with "on engine" fuel pump testing. The need for an auxiliary drive as well as an auxiliary fuel pump in the system of U.S. Pat. No. 3,577,776 virtually destroys the advantage of eliminating the test stand associated with "on engine" testing. Moreover the accuracy of any fuel pump test which involves operating the fuel pump at a constant check point speed will, obviously, depend on the degree to which the speed can be maintained constant. In order to achieve a high degreee of constancy in the selected speed of an engine responsive to fuel pressure, it would be necessary to employ hydraulic feedback to the control valve or to employ a variable speed auxiliary fuel pump drive combined with a pressure sensitive feedback control for maintaining extremely accurate control over the fuel pressure supplied to the engine during the pump test. In the absence of such accurate control it is difficult to operate an engine at a perfectly constant selected speed during the fuel pump test. Unfortunately, apparatus capable of providing such accurate fuel pressure control is expensive and complicated which adds greatly to the disadvantage of using a completely separate auxiliary fuel supply sustem. Still another disadvantage of employing an entirely separate fuel supply system is that the saftey equipment normally associated with the engine fuel system, such as the overspeed governor, is no longer operative when the engine is supplied with fuel from the auxiliary fuel system. Thus, safe operation of test apparatus involving a completely separate fuel supply system further requires a safety cut-off such as a fuel cut-off valve controlled by an overspeed or an overpressure sensor. Without such a safety device, an engine operated by such an auxiliary fuel supply could dangerously overspeed upon malfunction of the pressure regulator.

SUMMARY OF THE INVENTION

It is an object of this invention to overcome the deficiencies of the prior art as discussed above by providing an improved and simplified method and apparatus for performing "on engine" fuel pump tests.

It is another object of this invention to provide a simplified "on engine" fuel pump tester for testing the fuel pump mounted on an internal combustion engine of the type whose speed is responsive to the fuel pressure supplied to the engine by the fuel pump.

Another object of this invention is to provide a fuel pump test apparatus for testing the fuel pumps of internal combustion engines of the type whose speed is responsive to fuel pressure supplied to the engine wherein the test apparatus is extremely simple in design and wherein the fuel pump continues to supply fuel to the engine during the test.

Still another object of this invention is to provide a fuel pump test apparatus for an internal combustion engine of the type whose speed is responsive to the pressure of fuel supplied to the engine wherein the speed at which the pump is driven and the flow rate of the fuel being pumped may be independently and selectively controlled to correspond to any one of a plurality of different predetermined check points each of which is defined uniquely by a specific fuel pump speed and flow rate.

Another object of this invention is to provide a test apparatus for testing fuel pumps of the type which can be calibrated during a test procedure to produce a plurality of different output pressures when operated under a plurality of corresponding check point conditions each of which is defined by a particular speed and a particular flow rate, wherein the fuel pump remains mounted on and driven by the engine and continues to provide fuel to the engine during the pump test.

A more particular object of this invention is to provide an "on engine" fuel pump test apparatus including a fluid circuit for receiving the full output flow from the fuel pump and for returning a portion of this flow to the engine at a selectively adjustable pressure to control the speed at which the fuel pump is driven. The remaining portion of the total fuel pump output is returned to the fuel tank of the engine through a selectively variable restriction to control the total flow rate of the pump.

Still another object of this invention is to provide a fuel pump test apparatus for "on engine" testing of a fuel pump designed to supply fuel to the engine under a variable pressure to control engine speed wherein the test apparatus is designed to allow the normal engine safety controls to remain operative to insure against dangerous engine overspeeds.

Yet another object of this invention is to provide an "on engine" fuel pump test apparatus for an internal combustion engine whose speed is controlled by the pressure of fuel supplied to the engine from the fuel pump, wherein the test apparatus is designed to maintain a very stable engine speed by responding to increase in fuel pump pressure output due to engine speed increases by reducing slightly the pressure of fuel being supplied to the engine during the fuel pump test.

Still another object of this invention is to provide a method for testing and calibrating a fuel pump while mounted on and driven by an internal combustion engine whose speed is dependent upon the pressure of fuel supplied thereto by the fuel pump including the steps of passing one portion of the output of the fuel pump to the engine at a selective pressure substantially independent of the speed at which the fuel pump is driven in order to permit independent control of the engine speed and passing the remaining portion of the fuel output of the fuel pump through a variable restriction in order to permit substantially independent control of the total flow rate of the fuel pump.

Another object of this invention is to provide a method and apparatus, whereby an engine mounted fuel pump may be operated under full fuel flow conditions to permit monitoring of conditions on the suction side of the fuel pump.

Each of the above objects is accomplished by means of a portable test apparatus including a turbine meter for receiving and measuring the total fuel output of the fuel pump, a pressure regulator for directing a portion of the fuel at a controllable pressure to the fuel line of an engine and a valved drain line for returning the remaining portion of the pumped fuel to the engine's fuel tank. Engine speed, as measured by a tachometer, is adjusted by means of the pressure regulator to any one of a plurality of fuel pump check point speeds at which delivery characteristics are known for a properly calibrated and operating fuel pump. By adjusting the drain line valve, the fuel flow rate as measured by a turbine meter may be set at the fuel flow rate corresponding to each check point speed to permit measurement, by means of a transducer, of fuel pressure in the fuel pump outlet and comparison of this amount with the specifications for a properly calibrated pump. The same test is repeated at a plurality of different speed and flow rate check point values.

Further objects and advantages of the subject invention can be appreciated by consideration of the drawings and the detailed description of the preferred embodiment hereinbelow.

DESCRIPTION OF THE PREFERRED EMBODIMENTS

Figure 1:
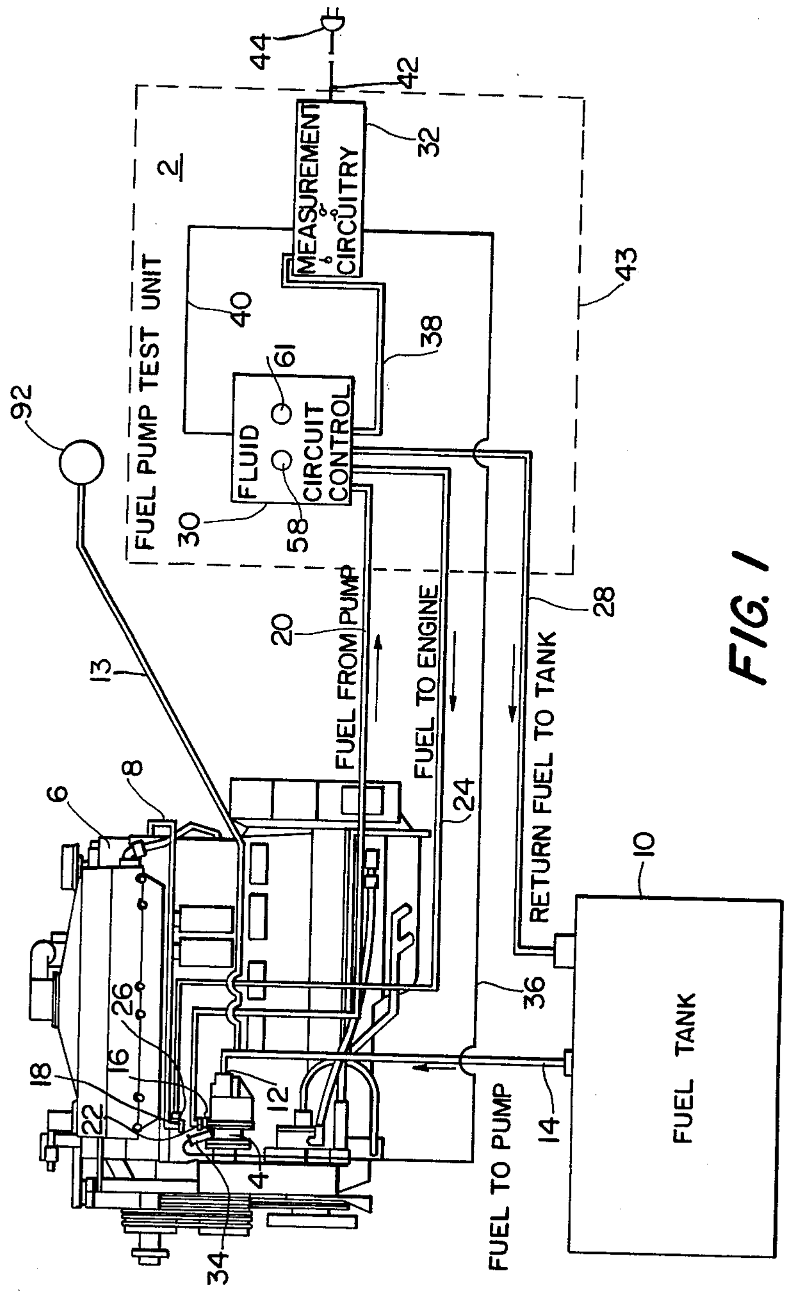
FIG. 1 is a schematic illustration of a fuel pump test system designed in accordance with the subject invention when the system is connected to test a fuel pump mounted on and driven by a internal combustion engine.

The illustration of FIG. 1 graphically demonstrates the advantages achieved by the subject invention whereby an internal combustion engine fuel pump may be tested by a relatively simple test apparatus while the fuel pump remains mounted on and driven by the internal combustion engine to which the fuel pump supplies fuel under pressure. This advantageous result is achieved by continuing to rely on the fuel pump being tested to supply the fuel necessary to operate the internal combustion engine and is achieved even though the engine illustrated in FIG. 1 is be of the type whose speed is a direct function of the pressure of fuel supplied thereto by the fuel pump. Turning now to the details of the system illustrated in FIG. 1, a fuel pump test unit 2 is schematically illustrated within the dashed lines. This test unit is fluidically and electrically connected with the fuel pump 4 mounted on and driven by an engine 6 of the type whose speed is directly controlled by the pressure of fuel normally supplied thereto by the fuel pump 4 through the fuel line 8. One example of such an engine is a diesel engine model number NTC-350 manufactured by Cummins Engine Company, Inc., Columbus, Indiana. Fuel pump 4 is of the type illustrated in U.S. Pat. No. 3,139,875, assigned to Cummins Engine Company, Inc., wherein the fuel pump is driven directly by the engine and is thus directly responsive to the engine speed. The output of this fuel pump is normally connected through a single line (rail line) to each of a plurality of injectors (not shown) associated with the respective combustion cylinders of the engine. The injectors are designed so as to respond to the pressure (rail pressure) to control, in response thereto, the amount of fuel supplied to the cylinder for each power stroke of the piston associated therewith. Fuel from a fuel tank 10 is normally supplied to the fuel pump inlet 12 via supply line 14. The outlet 16 of the fuel pump is normally connected to fuel line 8 by means of a coupling 18. The fuel line 8 is, in turn, connected to the rail line of the engine.

The fuel pump test unit 2 comprises two major components including fluid circuit controls 30 to which flexible conduits 20, 24 and 28 are connected and measurement circuitry 32 for measuring various fuel delivery characteristics (including flow rate and pressure) of the fuel pump 4 in order to determine the need for recalibration or replacement of the fuel pump. As illustrated in FIG. 1, measurement circuitry 32 is connected to a fuel pump speed sensor 34 by means of an electrical connection 36.

As will now be explained, the fuel pump 4 may be very simply prepared for test and calibration using the disclosed apparatus by disconnecting coupling 18 from pump outlet 16 and connecting one end of the flexible inlet conduit 20 to pump outlet 16 by means of a conduit coupling 22. By virtue of this connection, the fuel pump test unit receives the total fuel output from the fuel pump 4 as will be explained in more detail hereinbelow, a portion of this fuel is returned to fuel line 8 by means of a flexible outlet conduit 24 connected to fuel line 8 by conduit coupling 26. The remaining portion of the output of fuel pump 4 is returned to the fuel tank via a third flexible conduit 28 extending between the fuel pump test unit and the engine fuel tank 10. The pressure of fluid supplied to flexible inlet conduit 20 by the fuel pump is determined by means of a fluid signal transmitted to the measurement circuitry 32 via a fluid signal line 38 interconnecting the fluid circuit controls 30 and the measurement circuitry 32. The total flow of fuel from the fuel pump through flexible inlet conduit 20 is measured within the fluid circuit controls to produce an electrical signal transmitted to the measurement circuitry via electrical signal line 40. Electrical power for operating the measurement circuitry of the fuel pump test unit may be provided via power lines 42 adapted to be connected to a battery or to standard commercial power by means of plug 44. Although not illustrated in FIG. 1, the fuel pump test unit 2, because of its simplicity, may be contained within a small portable housing (schematically illustrated by dashed lines 43) in combination with conduits 20, 24 and 28 and electrical lines 36 and power lines 42. As will be described in much greater detail hereinbelow, this very simple, portable system is adapted to test a fuel pump while mounted on and driven by an internal combustion engine which is speed responsive to the pressure of fuel supplied thereto. The unique design of this system also permits a fuel pump to be tested with greater safety and accuracy by means of apparatus considerably simpler than has been known heretofore.

Figure 2:
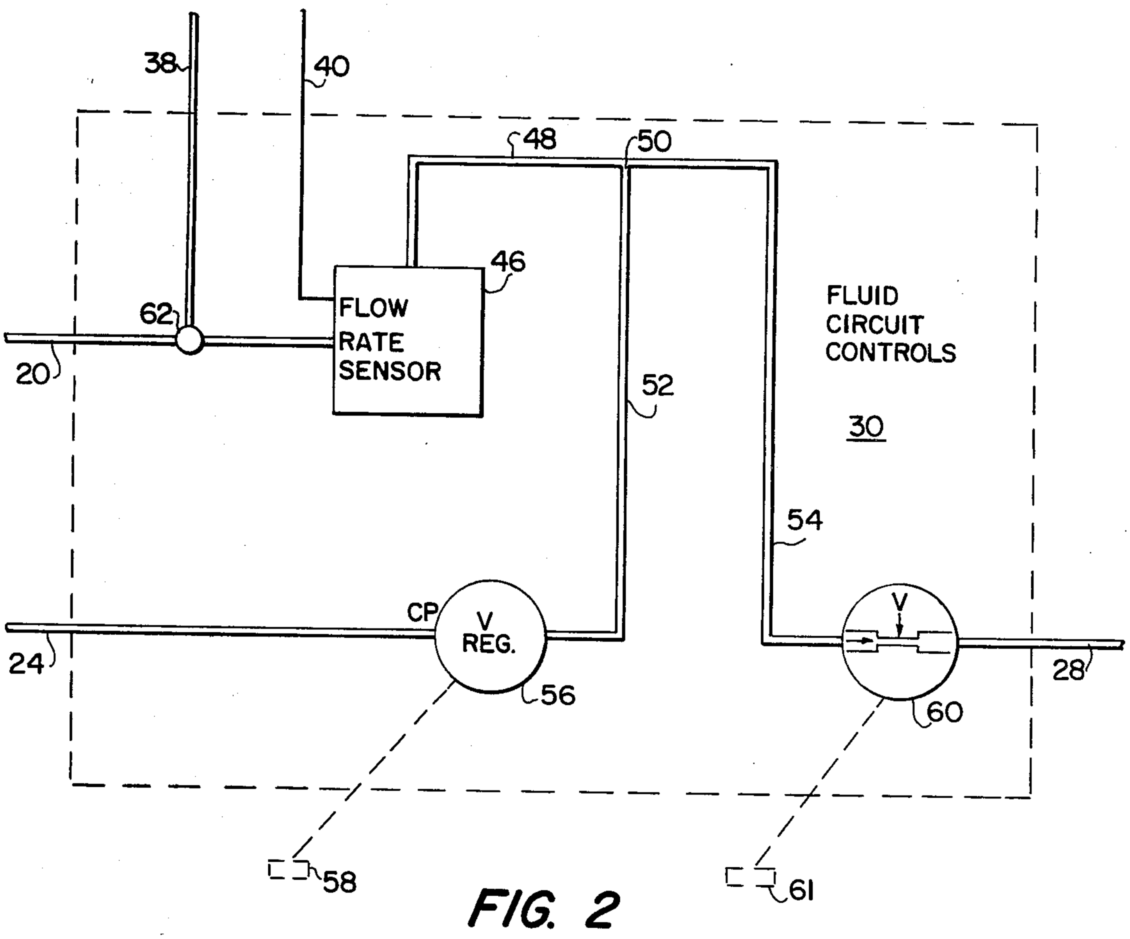
FIG. 2 is a detailed schematic of the fluid control system employed in the test apparatus illustrated in FIG. 1.

Referring now to FIG. 2, a more detailed schematic diagram of the fluid circuit controls 30 is illustrated. Flexible inlet conduit 20 supplies the total output of fuel pump 4 for passage through a flow rate sensor 46 such as a turbine meter manufactured by FloScan Instrument Company, Inc, Model No. 300-3, which is designed to provide an electrical signal on signal line 40 representative of the rate of flow through conduit 20. This electrical signal would normally take the form of a plurality of electrical pulses the frequency of which is directly proportional to the rate of fuel flow. After passing through the flow rate sensor 46, the fuel advances through conduit 48 and is divided at point 50 so that one portion passes through a fuel supply conduit 52 to supply fuel to the engine through flexible outlet conduit 24 and the remaining portion of the fuel is passed through drain conduit 54 for return to the fuel tank 10 through the third flexible conduit 28. In order to control the pressure at which fuel is supplied to the engine, an adjustable pressure regulator 56 (for example, Wattsco Pressure Regulator, RW-110-B) is provided for controlling the pressure of fuel supplied to flexible conduit 24 without substantial regard to the pressure of fuel supplied through fuel supply conduit 52. A manual pressure control knob 58 (illustrated in dashed lines) operable from the exterior of the portable housing 43, within which the fluid circuit controls are mounted, is provided to permit the technician or mechanic conducting the test to selectively adjust the pressure of fuel supplied through flexible outlet conduit 24, thereby to select the speed at which internal combustion engine 6 drives the fuel pump 4. Because of the characteristics of the pressure regulator 56 and the tendency of the ful pump 4 to increase supply pressure with increased engine speed, a very stable engine speed may be attained upon adjustment of the pressure regulator to a desired pressure. This feature of the system will be described in greater detail hereinbelow.

A fuel pump of the type illustrated in FIG. 1 is normally calibrated by operating the pump under each of a plurality of check point conditions at which corresponding delivery characteristics of a properly operating and calibrated fuel pump are known. Normally these check point conditions are each defined by a specific flow rate and driven speed. When the engine throttle is set at its maximum open position, the pressure regulator 56 can be adjusted to cause the engine to drive the fuel pump at a particular checkpoint speed while the flow rate of the fuel pump may be adjusted by means of variable restriction valve 60 operated by manual control knob 61 positioned between drain conduit 54 and the third flexible conduit 28. Valve 60 is needed to create an adjustable resistance to flow in the fluid outlet circuit of the fuel pump thereby to control selectively the flow rate of the fuel pump. While the pressure regulator 56 and the variable restriction valve 60 operate substantially independently to control the fuel pump speed and the fuel pump flow rate, respectively, some interaction exists between the operation of these valves thereby requiring concommitant adjustment in order to cause the fuel pump to operate under a selected check point condition. When the fuel pump is properly operating at the selected check point, the static pressure at the output of the pump is measured. For this purpose, fluid signal line 38 is connected with the flexible inlet conduit 20 at point 62 in order to transmit a fluid signal to the measurement circuitry as explained below.

Figure 3:
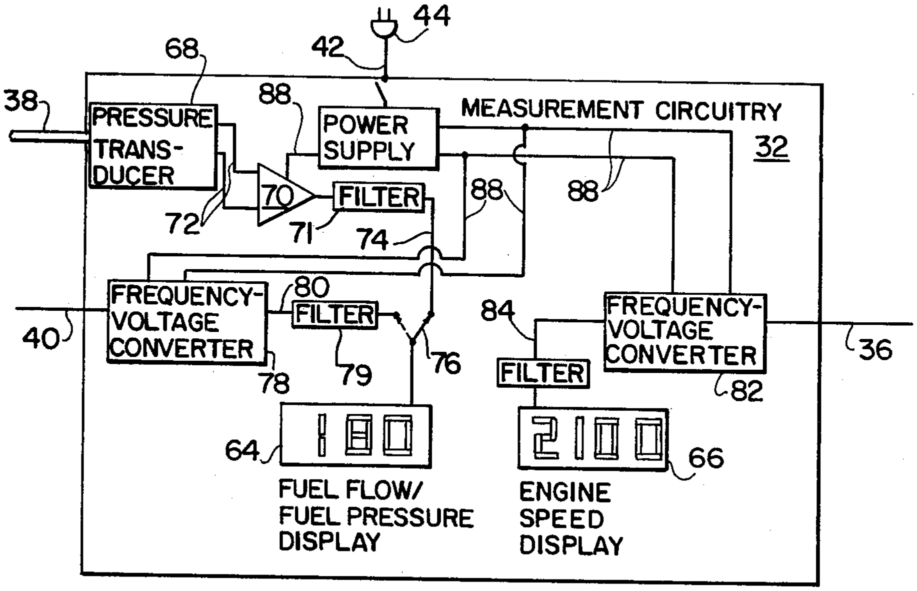
FIG. 3 is an electrical schematic diagram of the electrical test circuitry employed in the test apparatus of FIG. 1.

Reference is now made to FIG. 3 in which a detailed schematic diagram is presented of the measurement circuitry 32 mounted within the fuel pump test unit 2. In particular, the measurement circuitry 32 includes a first display 64 for displaying an optically readable digital representation of either fuel flow rate or fuel pressure while a second display 66 is designed to display an optically readable digital representation of the engine speed and thus the speed at which the fuel pump is being driven. Each display may be a digital panel meter which operates to convert an input voltage into an optical display of a number representative of the magnitude of the input voltage. The static fluid pressure signal supplied through fluid signal line 38 is received by a pressure transducer 68 of any standard design capable of converting the static fluid pressure signal within fluid signal line 38 into an electrical signal transmitted to amplifier 70 through electrical signal lines 72. The output of amplifier 70 is passed through filter 71 and sent to first display 64 through electrical connection 74 and display switch 76 when the switch is in the position illustrated in FIG. 3. The pulse signal received on electrical signal line 40 from the flow rate sensor 46 is converted to a voltage signal by a frequency to voltage converter 78 wherein the amplitude of the output voltage signal is representative of the flow rate. The output of converter 78 may be provided to the first display 64 through an appropriate filter 79 and an output line 80 whenever display switch 76 is moved to the position shown in dashed lines in FIG. 3.

The fuel pump speed signal is provided by electrical connection 36 in the form of electrical pulses the frequency of which is representative of the fuel pump driven speed. This pulsed signal is connected to a frequency to voltage converter 82 to convert the received pulses to a voltage the amplitude of which is representative of the frequency of the signal on electrical connection 36 and is thus representative of the speed at which the fuel pump is being driven by the engine. This voltage signal is provided to the second display 66 through an appropriate filter and through electrical connection 84. A scaling circuit may be provided to scale the electrical engine speed signal to give a true engine speed representative signal dependent upon the particular engine upon which the fuel pump is mounted. This feature is particularly useful where the fuel pump speed is driven at a fixed ratio of engine speed other than 1:1.

Electrical power is supplied to the frequency to voltage converters 78 and 82 and to amplifier 70 by a power supply 86 adapted to receive appropriate electrical power through plug 44 and power line 42 and to convert this standard power to a supply voltage level at which the amplifier and converters are designed to operate. Such operating power is supplied through electrical wires 88.

Figure 4:
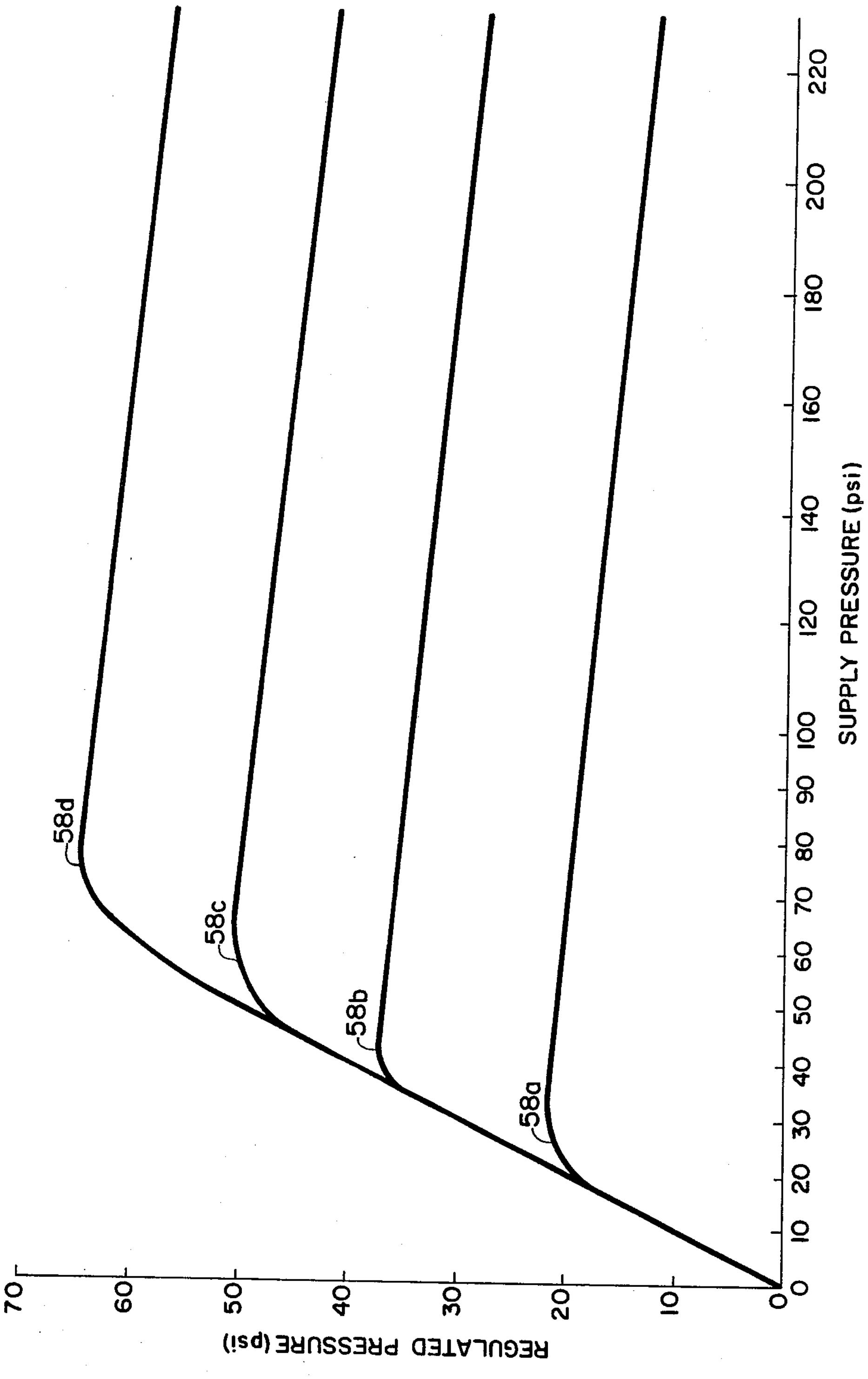
FIG. 4 is a graph illustrating the relationship between inlet supply pressure and outlet regulated pressure of the pressure regulator valve illustrated in FIG. 2.

FIG. 4 is a graphic representation of the relationship between the supply pressure and the regulated output pressure of the pressure regulating valve 56 wherein for a given setting of manual pressure control knob 58, the regulated output pressure in flexible outlet conduit 54 will depend to some degree on the supply pressure of fuel received by the regulating valve via fuel supply conduit 52. In particular, FIG. 4 demonstrates that the regulated output pressure will tend to decrease with increased input pressure after the input pressure increases above the level of the desired output regulated pressure set by manual control 58. Thus, if control knob 58 is set at 20 psi, the above inverse relation will prevail once the supply pressure exceeds 20 psi as illustrated by line **58*a***. Similarly, lines 58*b*, **58*c* and 58*d* disclose this relation at manual settings of 35, 45 and 65 psi. This characteristic of the pressure regulator valve is relatively common and well-known and is not normally thought to be desirable. However, in the subject environment, it has the beneficial result of causing the engine to operate at an unusually stable speed once the manual pressure control knob 58 is adjusted and the variable restriction valve has been set to cause the fuel pump to develop a desired flow rate at a rated speed. In particular, the fuel pump of the type illustrated in FIG. 1 will normally respond to increased engine speed by increasing the pressure of the fuel supplied to its output. Accordingly, a slight increase in the speed of engine 6 will result in a corresponding increase in the fuel supplied to regulator 56 via fuel supply conduit 52. This increase in fuel pressure at the input of the pressure regulator 56 will cause, as can easily be seen in FIG. 4, a slight decrease in the regulated fuel pressure supplied to flexible outlet conduit 24. As discussed above, the speed of engine 6 responds directly to the pressure of fuel supplied thereto and will thus tend to be reduced in response to a slight decrease in the output pressure within flexible outlet conduit 24. Alternatively, a slight decrease in engine speed will tend to cause a reduction in pressure supplied via fuel supply conduit 52 tending to return the engine to the desired speed. Therefore, the characteristics of the fuel pump and fuel pressure regulator 56 combine to produce an extremely stable engine speed once valves 56 and 60** are adjusted to cause the fuel pump to operate at a desired fuel pump check point.

Figure 5:
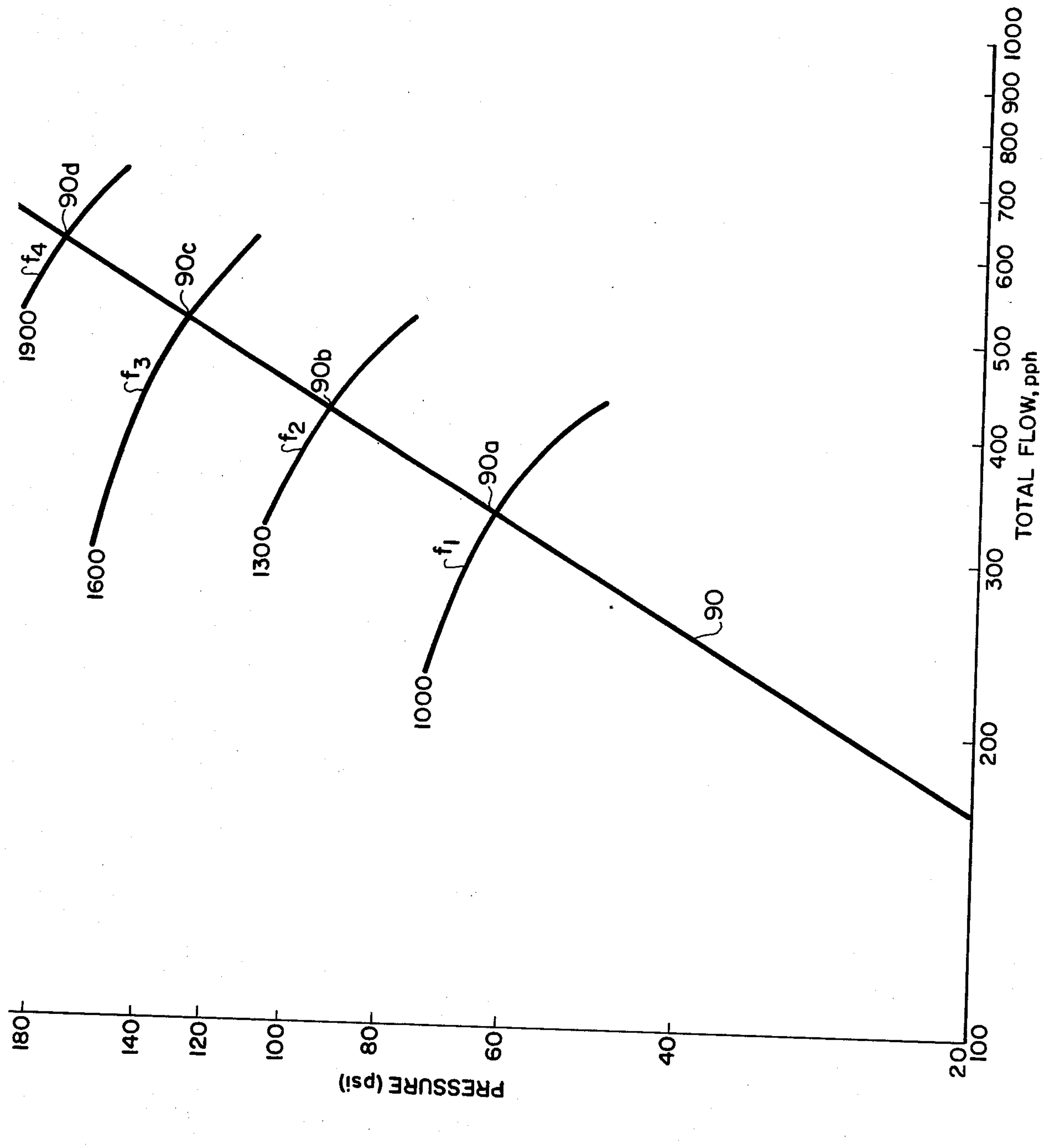
FIG. 5 is a graph of the total actual flow of a variable displacement fuel pump vs. the output pressure produced by such a fuel pump with isometric lines indicating the relationship of total flow vs. output pressure at constant engine speeds.

FIG. 5 discloses the relationship between the total flow of fuel from the fuel pump relative to the pressure of fuel supplied. Line 90 represents the flow characteristic of the engine and the curves $f_1$, $f_2$, $f_3$ and $f_4$ represent the flow characteristics of the fuel pump. Points **90*a*, 90*b*, 90*c* and 90*d* represent the desired operating characteristics of the fuel pump when being driven at the following speeds in revolutions per minute: 1000, 1300, 1600 and 1900, respectively. Points 90*a*–90*d* therefore represent check point values which would normally be provided to a mechanic or technician who has been assigned the task of checking and calibrating the fuel pump on an internal combustion engine of the type disclosed herein. For example, to test and calibrate a fuel pump using the check point data of FIG. 5 normally provided in tabular form, the technician or mechanic would first connect the fuel pump test unit to an engine in the manner illustrated in FIG. 1. Upon start-up the fuel pump throttle lever control is fixed at a full open position and manual flow control knob 61 is adjusted to cause the total flow of the fuel pump to reach the first test point value (approximately 330 pounds per hour). The manual pressure control knob 58 would then be adjusted to supply a pressure through flexible outlet conduit 24 sufficient to cause the engine to operate at 1000 revolutions per minute. Because the variable restriction valve 60 will have some effect upon the controlled pressure supplied to flexible outlet conduit 24, manual flow control knob 61 will need to be readjusted so as to return the flow rate to the desired level of 330 pounds per hour. Manual controls 58 and 61 will continue to be adjusted alternately until the engine is operating as close to the check point 90*a* as is consistent with the control capability of the fuel pump test unit. During this stage of the test, the display switch 76 is in the position illustrated in dashed lines in FIG. 3 so as to permit the fuel flow rate to be read from display 64 and the engine speed to be read from the second display 66. When the conditions displayed are those representative of check point 90*a*, display switch 76 is moved to the position illustrated in solid lines in FIG. 3 thereby to cause the first display 64 to show the pressure of fuel supplied to flexible inlet conduit 20 as measured by pressure transducer 68 through pressure signal line 38**.

The procedure described above is repeated for each of the check point conditions **90*b*, 90*c*, 90*d* and other points if desired. If the pressure measured at each of these checkpoints is not that shown on the specification data provided to the technician or mechanic, minor adjustments may be made to the fuel pump 4** or, as is preferred, the fuel pump may be removed from the engine and adjusted in a manner prescribed by the pump manufacturer. If improper or erratic operation is sensed, the technician will, of course, be alerted to the fact that the fuel pump is in need of repair or replacement. This method, therefore, allows for "on engine" testing of the fuel pump under extremely stable conditions by use of a fuel pump test unit of surprising simplicity in view of the prior art which until now has taught the need for very complicated auxiliary fuel supply systems or completely separate test stand apparatus requiring removal of the fuel pump from the engine.

Some fuel pump systems of the type illustrated in U.S. Pat. No. 3,139,875 are also provided with a throttling plunger for correlating the air and fuel supplied to the engine during certain conditions which exist when the engine air manifold pressure is too low (occurring on turbocharged engines when the turbocharger has not reached design operating conditions). When equipped with such devices, such as illustrated in U.S. Pat. No. 3,945,302, an auxiliary air supply is provided to simulate the conditions under which normal air pressure has been reached in the intake manifold of the engine. The above outlined procedure for checking the fuel pump calibration may be followed. With fuel pumps provided with the air/fuel throttle plunger described above, engine specifications also provide for a pump calibration existing when insufficient air is supplied to the air/fuel control. To check such calibration, the auxiliary air supply is removed from the air/fuel throttle plunger and the engine is operated at a predetermined speed, such as 1600 rpm, and at the required flow at which the output pressure of the fuel pump may be checked and compared with the rated "no air" specification.

The subject system may also be modified to check the calibration of the air/fuel plunger setting described in greater detail in U.S. Pat. No. 3,945,302 if the fuel pump test unit is provided with a precision regulator and pressure indicating device to set the reduced pressure on the air/fuel control bellows. After this pressure is applied, the no air screw of the air/fuel control plunger is bottomed and the required fuel flow is set at 1600 rpm engine speed. Following the test, the no air screw is opened, the air pressure is removed from the air/fuel control bellows, and the output pressure of the fuel pump under "no air" conditions is set at the required speed and flow.

Due to the capability of this invention to operate a fuel pump "in situ" at full rated fuel flow, a thorough check of the fuel supply line to the fuel pump may also be easily performed. In particular, a vacuum gauge 92 (FIG. 1) may be connected to the fuel pump inlet 12 through a flexible line 13 to determine the actual inlet fuel pressure under selected fuel pump operating conditions. If a restriction or air leak has occurred which would disturb engine operation, the inlet fuel pressure will not be at its normal level. A sight gauge such as ST-998 sold as a service tool by Cummins Engine Co. may be used separately for this test to provide for visual detection of air leaks.

Yet another feature of the disclosed invention is the inherent safety of the system in that the pressure regulator valve characteristics (illustrated in FIG. 4) automatically tends to decrease engine speed whenever the engine speed moves above the level selected by the manual pressure control knob 58. It is this feature which also produces great stability as discussed above. Increased supply pressure on the upstream side of the pressure regulator valve 56 may also occur upon closing of the variable restriction valve 60 by manual flow control knob 61, thereby again reducing the output pressure supplied to flexible outlet conduit 24 causing a reduction in engine speed. Increases in engine speed caused by decreases of fuel pressure upstream of the valve 56, will be limited by the high speed governor, such as disclosed in U.S. Pat. No. 3,385,276, which are normally provided on engines whose speed is controlled by fuel pressure since connection of the fuel pump test unit in a manner illustrated in FIG. 1 does not render such high speed governors inoperative. In contrast, a system including a completely separate auxiliary fuel supply system will cause the high speed governor to be rendered inoperative.

An extremely simple and yet effective fuel pump test system has been disclosed which system can be extremely light weight and portable for very simple field testing. While a preferred embodiment of the present invention has been described, it should be apparent that it may be employed in different forms without departing from its spirit and scope.

Having thus described the invention, what is claimed novel and desired to be secured by letters patent of the United States is:

1. Apparatus for testing the fuel pump of an internal combustion engine equipped with a pressure-time type fuel supply system wherein the engine speed may be controlled by adjusting the pressure of fuel supplied to the engine through the fuel supply system, comprising (a) fuel inlet means adapted for fluid connection with the engine fuel pump for receiving the total fuel output of the fuel pump while the pump remains mounted on and mechanically driven by the engine;

(b) fuel outlet means fluidically connected with said fuel inlet means and adapted for fluid connection with the fuel supply system for supplying at least a portion of the fuel output of the engine fuel pump back to the fuel supply system for combustion in the engine;

(c) pressure regulator means fluidically connected with said fuel inlet means and said fuel outlet means for selectively regulating the pressure of the fuel supplied to said outlet means to cause the engine to drive selectively the fuel pump at each one of a plurality of predetermined speeds; and (d) sensing means for measuring the delivery characteristics of the fuel pump at each of the plurality of predetermined speeds at which the fuel pump is driven.

2. Apparatus as defined in claim 1, further including drain means connected with said fuel inlet means for receiving the portion of fuel supplied to said inlet means by the fuel pump which is not supplied to said fuel outlet means.

3. Apparatus as defined in claim 2, wherein said drain means includes an adjustable flow restriction means for adjustably setting the resistance to flow of fluid within said drain means to control the rate of fuel flow through said fuel inlet means.

4. Apparatus as defined in claim 3, further including tachometer means for producing a manifestation indicative of the speed at which the fuel pump is driven by the engine, and wherein said sensing means includes a pressure sensing means for producing a manifestation indicative of the pressure of the fuel output of the fuel pump and a flow sensing means for producing a manifestation indicative of the volume flow rate of fuel from the fuel pump to said inlet means, and display means for converting said manifestations to an optically readable display.

5. Apparatus as defined in claim 4, further including a portable housing within which is mounted said pressure sensing means, said flow sensing means, said pressure regulator means, said adjustable flow restriction means, and said display means and further wherein said fuel inlet means includes a first flexible conduit connected at one end to said portable housing and a first fitting positioned at the other end of said first flexible conduit for connection with the outlet of the fuel pump, said fuel outlet means includes a second flexible conduit connected at one end to said portable housing and a second fitting positioned at the other end of said second flexible conduit for connection with the engine fuel supply system, and said drain means including a third flexible conduit connected at one end to said portable housing and the other end of said third flexible conduit returning fuel to the engine fuel supply.

6. Apparatus as defined in claim 4, wherein said pressure regulator means includes a first handle mounted for operation from the exterior of said portable housing to modify the pressure of fuel supplied to said fuel outlet means and said adjustable flow restriction means includes a second handle also mounted for operation from the exterior of said portable housing for modifying the resistance of fuel flow in said third flexible hose.

7. Apparatus as defined in claim 4, wherein said manifestations are electrical signals and wherein said display means includes a first digital panel meter for converting the electrical signal from said tachometer means into an optical display of the rotational speed of the fuel pump, a second digital panel meter designed selectively to convert either the electrical signal from the flow sensor means or from the pressure transducer means into an equivalent optical display and an electrical switch for selectively connecting the electrical signal from said flow sensor means or said pressure transducer means to said second digital diaplay.

8. Apparatus as defined in claim 4, wherein said tachometer means includes an engine speed sensor means for producing an electrical engine speed signal indicative of the engine speed and a scaling circuit means selectively connected with said engine speed sensor means to scale said electrical engine speed signal to an electrical signal indicative of the fuel pump speed when the speed of the fuel pump being tested is at a fixed ratio other than 1 compared with the engine speed.

9. Apparatus as defined in claim 1 further including inlet pressure means adopted for fluid connection with the fuel inlet of the fuel pump being tested for sensing the pressure of fuel supplied to the fuel pump inlet, whereby the system for supplying fuel to the engine fuel pump may be tested.

10. A method for testing and calibrating a fuel pump mounted on and driven by an internal combustion engine equipped with a pressure-time type fuel supply system wherein the engine speed is dependent upon the pressure of fuel normally supplied to the engine by the fuel pump, comprising the steps of (a) connecting a pressure regulator between the fuel pump outlet and the engine to permit independent selective regulation in the pressure of fuel while the fuel pump is still mounted on and driven by the engine and while the fuel pump continues to supply fuel to the engine;

(b) adjusting the pressure of fuel supplied by the pressure regulator to the engine to cause the engine to operate at each one of a plurality of different engine speeds; and (c) measuring the fuel delivery characteristics of the fuel pump at each of the selected engine speeds.

11. The method as defined in claim 10, further including the step of adjusting the flow rate of fuel supplied by the fuel pump substantially independently of the selected speed at which the fuel pump is driven by the engine.

12. The method as defined by claim 11, wherein fuel is supplied to the fuel pump from a fuel tank further including the step of dividing the fuel supplied by the fuel pump by passing a portion through the pressure regulator and passing the remaining portion back to the fuel tank through a variable restriction valve.

13. The method as defined in claim 12, further including the step of adjusting the total flow rate of fuel supplied by the fuel pump to a predetermined value by varying the restriction of the variable restriction valve.

14. A method as defined in claim 10 for testing a fuel pump having an adjustable throttle normally operative to control the delivery characteristics of the fuel pump to control thereby the engine operation, wherein the method further includes the step of locking the throttle in the fully open position during the fuel pump test.

15. The method as defined in claim 10, for testing a fuel pump which may be adjusted to provide a different desired output pressure at different fixed speeds and fuel flow rates, wherein the method includes the step of calibrating the fuel pump by adjusting the fuel pump speed to a predetermined fixed value and adjusting the fuel flow rate to a predetermined corresponding fixed value and adjusting the fuel pump to provide a desired output pressure at the fuel pump speed and flow rate at which the fuel pump is operating.

16. The method as defined in claim 15, further including the step of repeating the step of adjusting the fuel pump to provide a desired output pressure for each of a plurality of predetermined check points defined by a fixed fuel pump speed and a corresponding fuel pump flow rate.

17. Apparatus for safely testing the fuel pump of an internal combustion engine wherein engine speed may be controlled by adjusting the pressure of fuel supplied to the engine through a fuel supply system by the fuel pump and wherein a high speed governor is provided to limit the maximum pressure of fuel supplied to the engine by the fuel pump in order to limit the maximum speed of the engine, comprising (a) fuel inlet means adapted for fluid connection with the engine fuel pump for receiving the total fuel output of the fuel pump while the pump remains mounted on and mechanically driven by the engine and while the high speed governor remains operative to limit the maximum speed of the engine through control of the pressure of fuel supplied to the engine;

(b) fuel outlet means fluidically connected with said fuel inlet means and adapted for fluid connection with the fuel supply system for supplying at least a portion of the fuel output of the engine fuel pump back to the fuel supply system for combustion in the engine;

(c) pressure regulator means connected with said inlet means for selectively regulating the pressure of the fuel supplied to said outlet means to cause the engine to selectively drive the fuel pump at a highly stable speed by slightly decreasing the pressure of fuel supplied to said outlet means whenever the pressure of fuel supplied to said inlet means by the fuel pump increases;

(d) drain means connected with said fuel inlet means for receiving the portion of fuel supplied to said inlet means by the fuel pump which is not supplied to said fuel outlet means, said drain means including an adjustable flow restriction means for adjustably setting the resistance to flow of fluid within said drain means to control the rate of fuel flow through said fuel inlet means; and (e) sensing means for measuring the delivery characteristics of the fuel pump at each of the plurality of predetermined speeds at which the fuel pump is driven, whereby any undesired increase in the flow restriction within said drain means will tend to slightly decrease engine speed due to the operation of said pressure regulator means and any undesired decrease in flow resistance within said drain means resulting in higher engine speed will be limited by the upper limit set by the high speed governor.

18. Apparatus for testing the fuel pump of an internal combustion engine wherein the engine speed may be controlled by adjusting the pressure of fuel supplied to the engine through a fuel supply system and wherein the pressure of fuel supplied by the fuel pump increases and decreases with increases and decreases, respectively, in the engine speed, comprising (a) fuel inlet means adapted for fluid connection with the engine fuel pump for receiving the total fuel output of the fuel pump while the pump remains mounted on and mechanically driven by the engine;

(b) fuel outlet means fluidically connected with said fuel inlet means and adapted for fluid connection with the fuel supply system for supplying at least a portion of the fuel output of the engine fuel pump back to the fuel supply system for combustion in the engine;

(c) pressure regulator means fluidically connected with said fuel inlet means and said fuel outlet means for selectively regulating the pressure of the fuel supplied to said outlet means to cause the engine to drive selectively the fuel pump at a highly stable speed by slightly adjusting the pressure of fuel supplied to said outlet means inversely with respect to engine speed; and (d) sensing means for measuring the delivery characteristics of the fuel pump at the highly stable speed at which the fuel pump is driven.

* * * * *